(12) United States Patent
Boehm et al.

(10) Patent No.: US 10,125,936 B1
(45) Date of Patent: Nov. 13, 2018

(54) APPARATUS AND METHOD FOR STANDING SOLAR LIGHTING ON HARD SURFACES

(71) Applicants: Dale Lee Boehm, Runaway Bay, TX (US); Gloria Ann Aguilera, Runaway Bay, TX (US)

(72) Inventors: Dale Lee Boehm, Runaway Bay, TX (US); Gloria Ann Aguilera, Runaway Bay, TX (US)

( * ) Notice: Subject to any disclaimer, the term of this patent is extended or adjusted under 35 U.S.C. 154(b) by 0 days.

(21) Appl. No.: 15/831,892

(22) Filed: Dec. 5, 2017

Related U.S. Application Data

(60) Provisional application No. 62/483,374, filed on Apr. 8, 2017.

(51) Int. Cl.
| | |
|---|---|
| *F21S 9/00* | (2006.01) |
| *F21S 9/03* | (2006.01) |
| *F16M 11/24* | (2006.01) |
| *F21S 9/02* | (2006.01) |
| *F21V 21/06* | (2006.01) |
| *F21V 21/14* | (2006.01) |
| *F21V 21/08* | (2006.01) |

(52) U.S. Cl.
CPC .............. *F21S 9/037* (2013.01); *F16M 11/24* (2013.01); *F21S 9/022* (2013.01); *F21V 21/06* (2013.01); *F21V 21/0824* (2013.01); *F21V 21/145* (2013.01); *F16M 2200/08* (2013.01)

(58) Field of Classification Search
CPC .............. F21V 1/00; F21V 21/30; F21V 21/00
USPC ................................... 362/185, 84, 276
See application file for complete search history.

(56) References Cited

U.S. PATENT DOCUMENTS

| | | | | |
|---|---|---|---|---|
| 4,105,203 | A * | 8/1978 | Cho | A63B 69/0091 473/429 |
| 9,080,751 | B2 * | 7/2015 | Steele | F21V 21/00 |
| 2005/0135101 | A1 * | 6/2005 | Richmond | F21S 9/037 362/276 |
| 2008/0218992 | A1 * | 9/2008 | Li | F21V 1/00 362/84 |
| 2017/0127824 | A1 * | 5/2017 | Schneider | A47B 37/04 |
| 2017/0227200 | A1 * | 8/2017 | Zhang | F21V 21/30 |

\* cited by examiner

*Primary Examiner* — Daniel A Hess
(74) *Attorney, Agent, or Firm* — Eldredge Law Firm, LLC; Richard Eldredge; Beth Felix

(57) ABSTRACT

A solar charged light apparatus for use on a hard surface, the apparatus includes a light body, having one or more lights contained within the body; a power source to power the one or more lights; and one or more solar panels secured to the body to charge the power source; an elongated stand having the light body secured to a top end of the stand, the stand having a base to support the stand on a hard surface; and one or more spikes to support the stand within a ground surface; the elongated stand can be oriented in a first position and a second position; the first position orients the one or more spikes to be used for support; and the second position orients the base to be used for support.

7 Claims, 5 Drawing Sheets

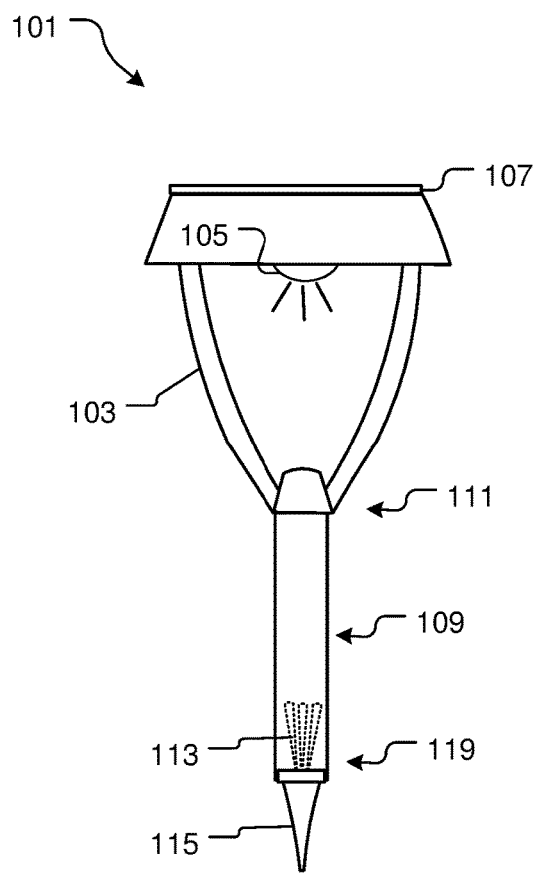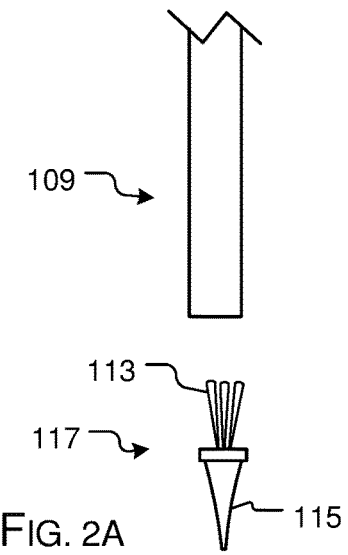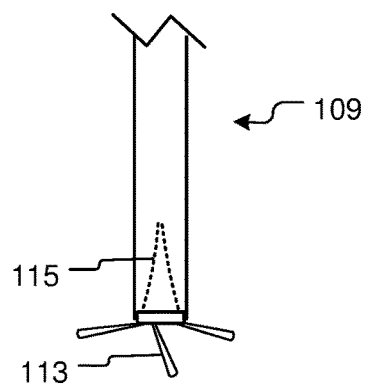
FIG. 2A
FIG. 1
FIG. 2B

APPARATUS AND METHOD FOR STANDING SOLAR LIGHTING ON HARD SURFACES

BACKGROUND

1. Field of the Invention

The present invention relates generally to light source systems, and more specifically, to an apparatus and method for standing solar lighting for uses such as an indoor emergency light source.

2. Background

Optimally, the power will never fail and grid connected lighting will be available for all situations. Unfortunately, many times and without warning, connected lighting sources are disrupted by disruptions in the electric grid's integrity in the distribution, transmission, or generation systems that provide power for standard lighting.

Though most homes have access to emergency light sources, such as flash lights and candles, they are can be difficult to locate once the power is out. In addition, candles can have extreme flame hazards, are difficult to light and place in a safe location, and have been show to produce various types of toxic fumes. Additionally, candles must be continually monitored as they encourage the young to play games with the open flame, hot waxes, and oils.

Flashlights are also commonly used in the event of a power outage. However, flashlights are generally lost in a drawer or contain dead batteries. Flashlights must therefore be checked for location and function on a regular basis. Even then, flashlights are often non-functional when needed or only last for a few minutes before the batteries are drained.

Accordingly, although great strides have been made in the area of emergency lighting systems, many shortcomings remain. There is a need for a lighting system that is convenient, safe, easy to locate, and deploy.

SUMMARY OF THE INVENTION

The present invention allows for solar powered lighting to be converted for indoor use by deploying stands designed for flat surfaces. The stands can be designed into the current solar yard, walkway, garden or accent lighting or provided separately to allow these readily available lights to be deployed for safe use as emergency in-door lighting.

In the present invention, when configured to allow for quick deployment designed into the current solar yard, walkway, garden or accent lighting offered today, this new design would allow for stands or legs to be deployed in place of a usually present spike. The legs or stands would then hold the light up-right above a table, counter or other flat surface to allow for good light distribution in an area. These legs or stands would be hidden inside the tube that serves as the stand stem when not deployed on the normally present spike. Legs or stands are envisioned to be in either end of the tube that serves as the stand stem.

Alternatively, stands or legs can be separate items not designed into the tube of the light stand, but with the same purpose of holding the solar light, either up-right or at any angle on a flat surface.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 is a side view of an apparatus for solar lighting on a hard surface in accordance with a first embodiment of the present application;

FIGS. 2A and 2B are side views of the stand from FIG. 1 in the various phases of deployment;

Figure 3:
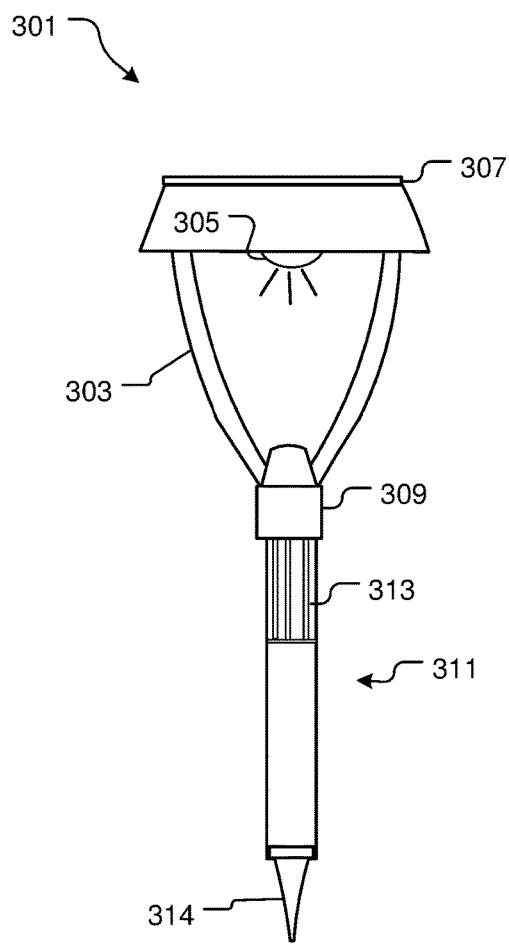
FIG. 3 is a side view of an apparatus for solar lighting on a hard surface in accordance with a second embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional emergency lighting systems. Specifically, the present invention provides a convenient and solar charged light source to be converted for use in-doors on flat, hard surfaces. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

In the present application, the terms Yard, Walkway, Garden or Accent lighting are used interchangeably to all mean any solar powered lighting designed for yard, garden, walkway or accent lighting in an outdoor setting. These are generally constructed with batteries that are charged by the sun each day using photovoltaic cells and automatically illuminate at sunset.

Referring now to the drawings wherein like reference characters identify corresponding or similar elements throughout the several views, FIG. 1 depicts a side view of a solar charged light apparatus in accordance with a preferred embodiment of the present application. It will be appreciated that apparatus 101 overcomes one or more of the above-listed problems commonly associated with conventional light source systems.

In the contemplated embodiment, apparatus 101 includes a light body 103 having one or more lights 105 contained therein. Lights 105 receive power from one or more power sources such as batteries, receiving charge from solar panels 107. Apparatus 101 further includes an elongated stand 109 having a first end 111 and a second end 119, wherein first end 111 is connected to light body 103. In this embodiment, stand 109 includes a base 113 and a spike 115, wherein the base 113 and spike 115 are configured to be oriented in opposite positions. As shown in FIGS. 2A-2B, the base/spike device 117 is removable from stand 109. In a first position, base 113 is secured within stand 109, thereby allowing for spike 115 to be inserted into a ground surface. In a second position (shown in FIG. 2B), the spike 113 is secured within stand 109, thereby allowing for base 113 to be used to support apparatus 101 on a hard surface. As shown, it is contemplated that base 113 can include a plurality of legs configured to extend out.

Figure 4A:
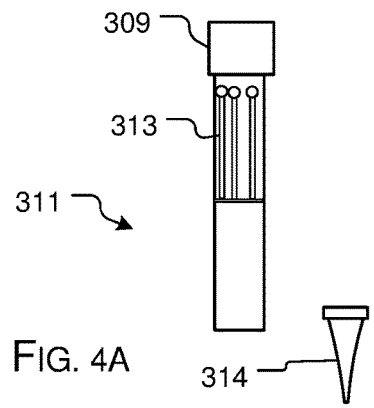
FIGS. 4A-4C are side views of the stand of FIG. 3 in various phases of deployment.
Figure 4B:
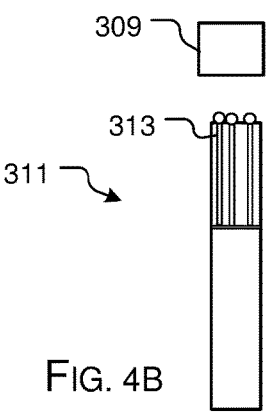
Figure 4C:
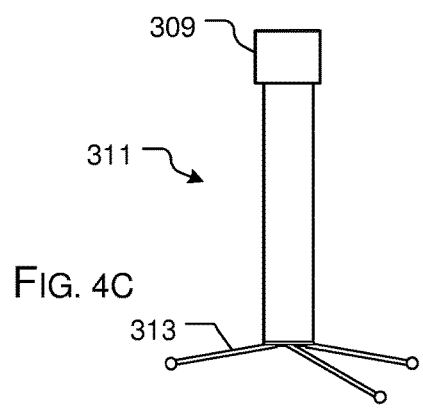

In FIG. 3, an alternative embodiment of solar charged light apparatus 301 is shown. Apparatus 301 is similar in form and function to apparatus 101, including a light body 303 having one or more lights 305, one or more solar panel power sources 307. In this embodiment, light body further includes a connection device 309 configured to receive an elongated stand 311. In the contemplated embodiment, the connection device is a hollow tube, configured to hold and receive the elongated stand via pressure. Stand 311 includes a removable spike 314 and base 313 secured within the interior of stand 311, wherein base 313 is configured to be extended out to provide support, as shown in FIGS. 4A-4C. As shown in FIGS. 4A-4C, stand 311 is removed from connection device 309, the stand is then rotated 180 degrees, wherein the base 313 can extracted from the end of the stand, thereby being usable to hold apparatus 301 on a hard surface. Alternatively, it is envisioned that base 313 may be located in either end of stand 311, which may not require a 180 degree rotation. As shown, it is contemplated that base 313 can include a plurality of legs configured to extend out.

Figure 5:
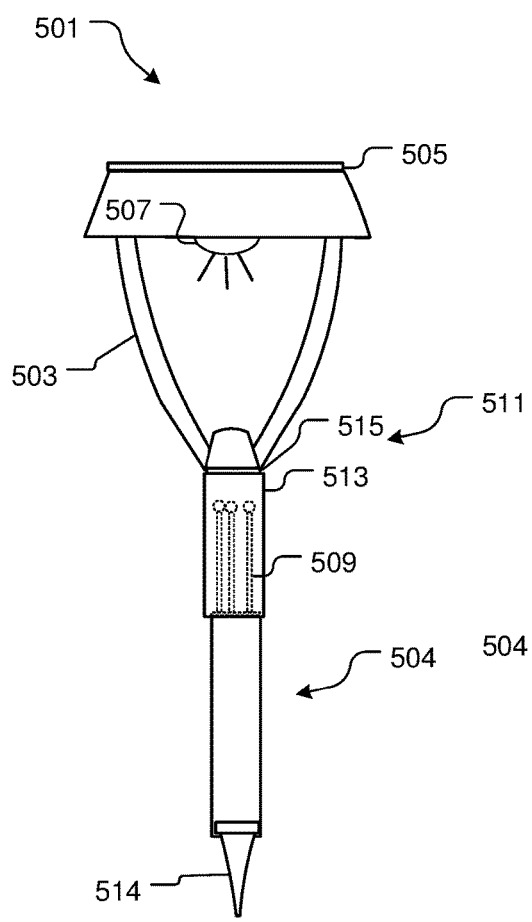
FIG. 5 is a side view of an apparatus for solar lighting on a hard surface in accordance with a third embodiment of the present application.
Figure 6A:
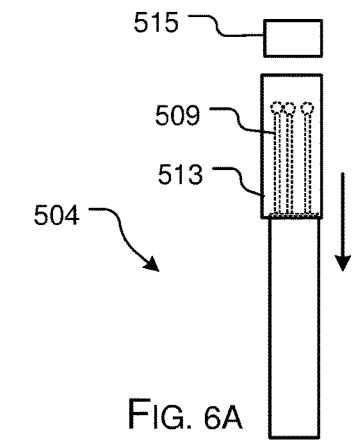
FIGS. 6A-6C are side views of the stand of FIG. 5 in various phases of deployment.
Figure 6B:
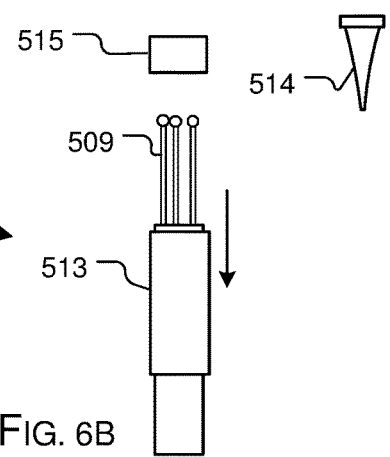
Figure 6C:
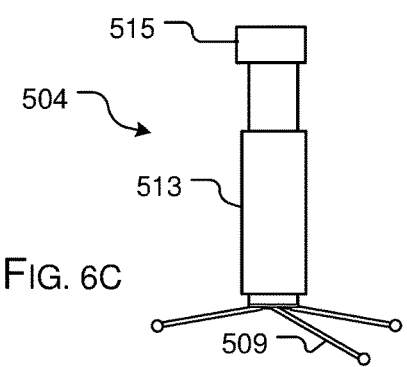

In FIG. 5, an alternative embodiment of a solar charged light apparatus 501 is shown, having similar form and function to apparatuses 101 and 301. Apparatus 501 includes a light body 503 having solar power 505, and a light 507. In this embodiment, apparatus 501 further includes a stand 504 having a removable spike 514 and a base 509 secured to a first end 511 of stand 504. Stand 504 further includes a cover 513 configured to slide away from and expose base 509, as shown in FIGS. 6A-6C. In this embodiment, cover 513 is configured to engage with a connection 515 of body 503. As shown in FIGS. 6A-6C, stand 509 is removed from connection device 515, the stand is then rotated 180 degrees, engaged with connection 515 of body 503, wherein the base 509 can be spread, thereby being usable to hold apparatus 501 on a hard surface. As shown, it is contemplated that base 509 can include a plurality of legs configured to extend out.

Figure 7A:
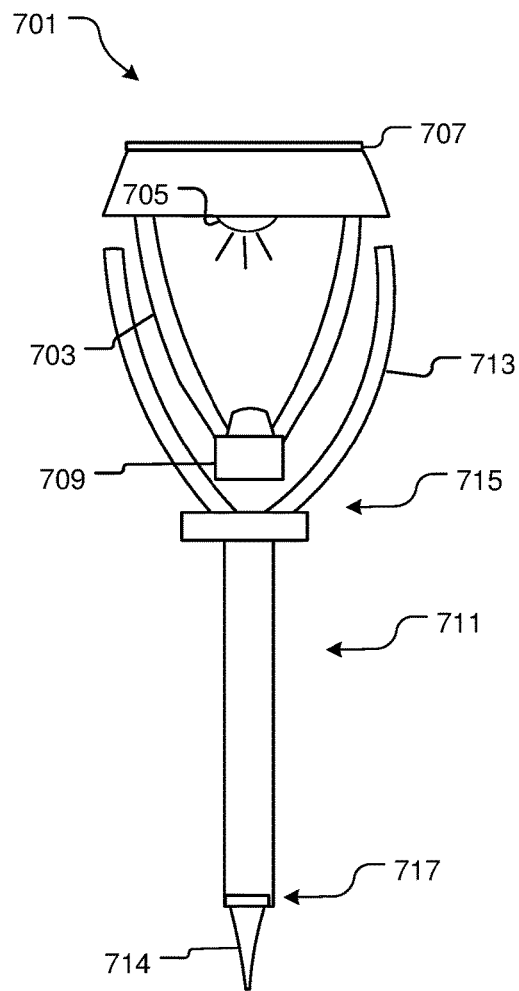
FIGS. 7A and 7B are side views of an apparatus for solar lighting on a hard surface in accordance with a fourth embodiment of the present application in various phases of deployment.
Figure 7B:
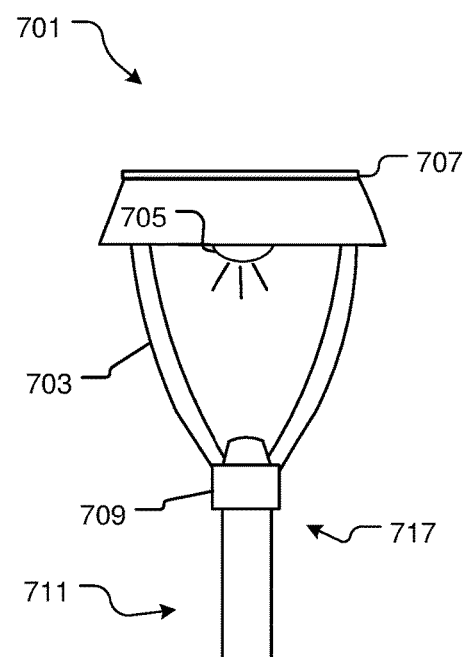
Figure 7B:
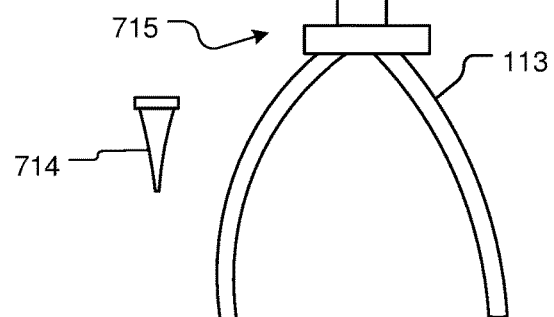

In FIGS. 7A and 7B, an alternative embodiment of a solar charged light apparatus 701 is shown, having similar form and function to the previously discussed embodiments. Apparatus 701 includes a light body 703 having a light 705, a solar panel power source 707, and a connection 709. Apparatus 701 further includes a stand 711 having a removable spike 714 and one or more arms 713 extending from a first end 715. The one or more arms 713 are configured to provide a cradle in which to support light body 703. Stand 711 is configured to be rotated 180 degrees, wherein a second end 717 of stand 711 can engage with connection 709, thereby placing the arms away from light body 703 to support apparatus 701 on a hard surface (as shown in FIG. 7B).

It should be appreciated that one of the unique features believed characteristic of the present application is the ability of the stand to provide at least two orientations, wherein a first orientation allows for insertion of the apparatus into the ground, and the other orientation allows for supporting the apparatus on a hard surface. It should be understood that this feature allows for a user to place the apparatus outdoors to charge via the solar panel. In the event of an emergency, the user can locate the apparatus and bring it indoors for use on a table or similar surface.

Figure 8:
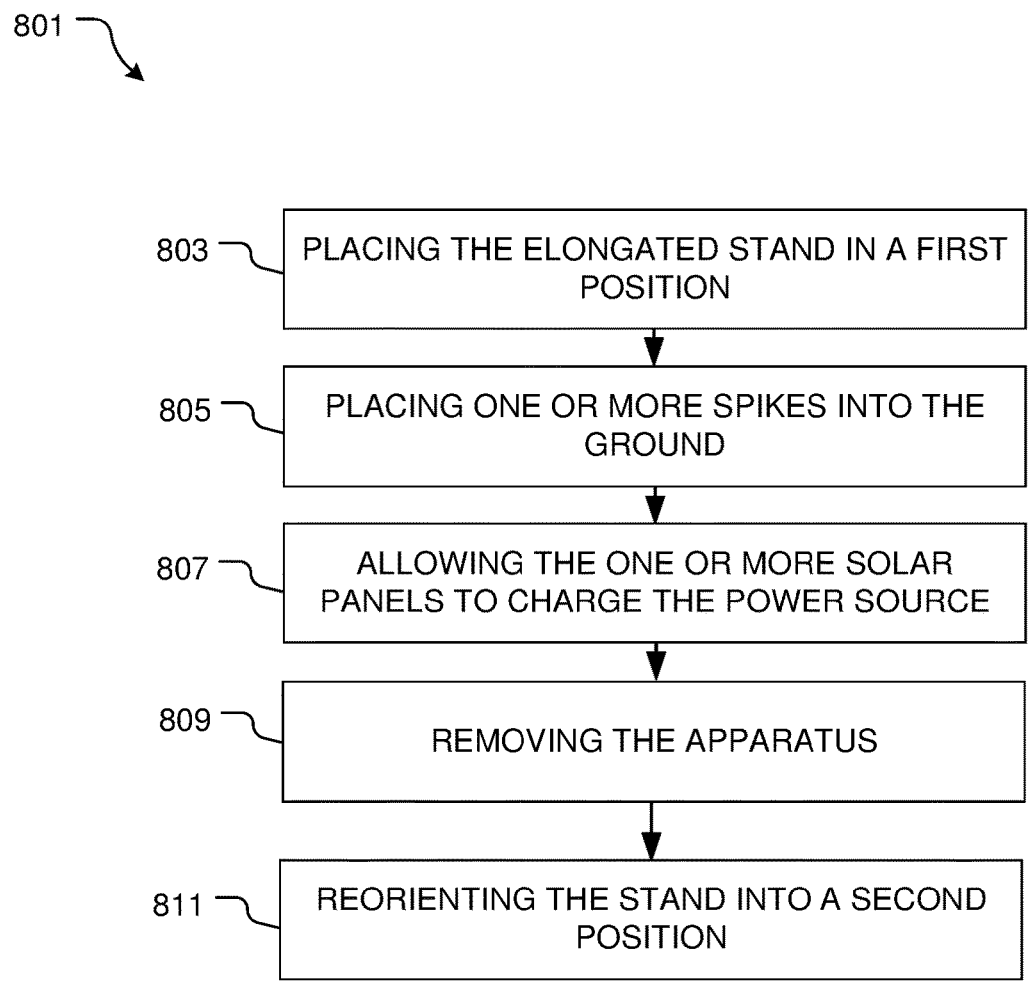
FIG. 8 is a flowchart of the method of use associated with the apparatuses of the present application.

In FIG. 8, a flowchart depicts the method associated with the present application. During use, the user places the elongated stand in a first position, wherein the first position allows the user to insert the stand into a ground surface, as shown with boxes 803, 805. The user can then allow the apparatus to charge, as shown with box 807. When needed, the user can remove the apparatus from the ground, reorient the stand, and place the apparatus on a hard surface, as shown with boxes 809, 811.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A solar charged light apparatus for use on a hard surface, the apparatus comprising:

a light body, having:
  one or more lights contained within the body;
  a power source configured to power the one or more lights; and
  one or more solar panels secured to the body and configured to charge the power source;
an elongated stand having the light body secured to a top end of the stand, the stand having:
  a base configured to support the stand on a hard surface; and
  one or more spikes configured to support the stand within a ground surface;
wherein the base and the one or more spikes are combined into one device;
wherein the base is configured to be stored within an opening of the elongated stand when the one or more spikes are in use;
wherein the one or more spikes is configured to be stored within the opening of the elongated stand when the base is in use;
wherein the elongated stand can be oriented in a first position and a second position;
wherein the first position orients the one or more spikes to be used for support; and
wherein the second position orients the base to be used for support.

2. The apparatus of claim 1, wherein the base comprises one or more legs configured to extend out from the elongated stand to support the elongated stand.

3. The apparatus of claim 1, wherein the elongated stand is removable from the light body.

4. The apparatus of claim 3, wherein the base is secured to a first end of the elongated stand and the one or more spikes is secured to a second end of the elongated stand.

5. The apparatus of claim 4, further comprising a cover configured to removably secure to the first end of the elongated stand, thereby covering the base.

6. A method of having solar light supported on a hard surface, the method comprising:
  providing the system of claim 1;
  placing the elongated stand in the first position;
  placing the one or more spikes into a ground surface;
  allowing the one or more solar panels to charge the power source;
  removing the system of claim 1 from the ground surface; and
  reorienting the elongated stand into the second position;
  wherein the second position allows for use of the system on a hard surface via the base.

7. A solar charged light apparatus for use on a hard surface, the apparatus comprising:
  a light body having a connection positioned on a base of the light body, the light body having:
    one or more lights contained within the body;
    a power source configured to power the one or more lights; and
    one or more solar panels secured to the body and configured to charge the power source;
  an elongated stand configured to removably cradle and connect to the light body at a first end, the elongated stand having:
    one or more arms extending from the elongated stand at a first end;
  wherein the elongated stand can be oriented in a first position and a second position;
  wherein the first position orients the one or more arms on the first end to cradle the light body and one or more spikes are secured to the second end; and
  wherein the second position orients the one or more arms to be used to position the light on hard surfaces and the second end is secured to the light body without the one or more spikes.

\* \* \* \* \*